United States Patent Office 3,294,428
Patented Dec. 27, 1966

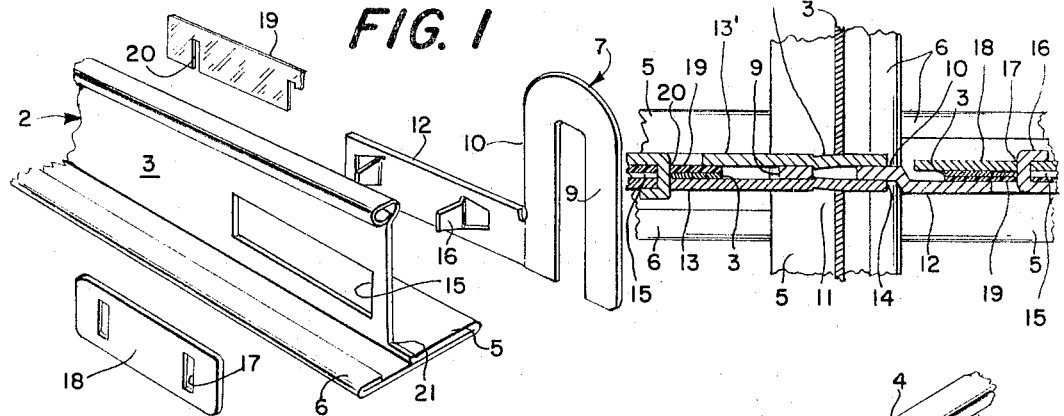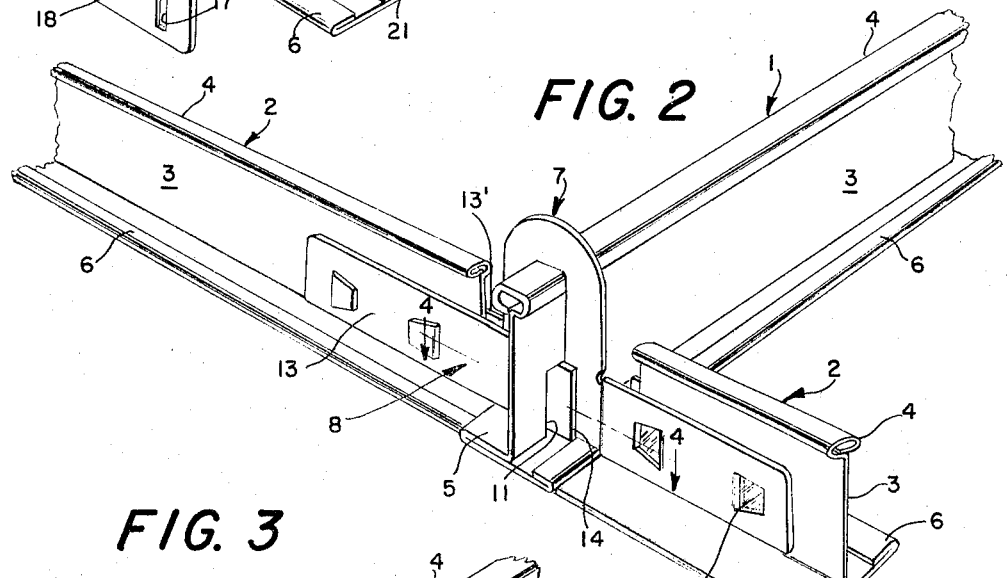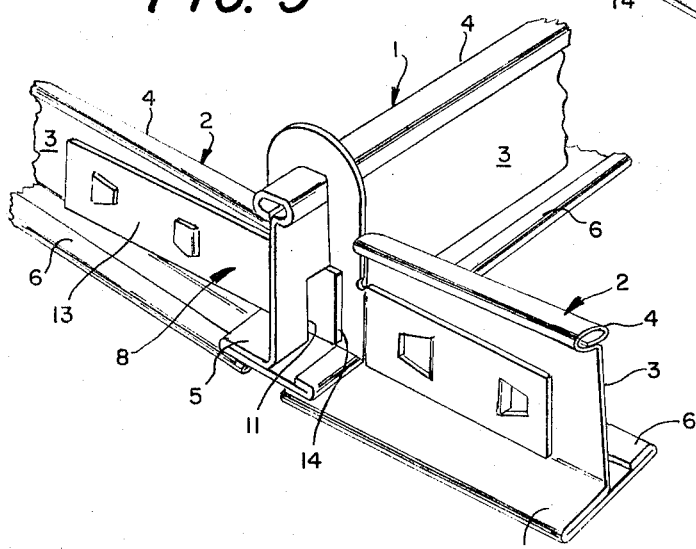

3,294,428
EXPANSION JOINT AND LOCKING CONNECTION FOR SUPPORTING GRID SYSTEMS
Robert P. Lickliter, 113 Buffalo St., and Earl Abbott, 81 Dudley Ave., both of Hamburg, N.Y. 14075, and John F. Reeves, Tonawanda, N.Y.; said Reeves assignor to said Lickliter and said Abbott
Filed Aug. 7, 1963, Ser. No. 300,442
5 Claims. (Cl. 287—189.36)

This invention relates generally to the support art, and more specifically to a new and useful expansible connection for supporting grid systems and the like.

Our invention is particularly concerned with the provision of expansion means in tile supporting grid members used in fire retarding ceilings, although it is not necessarily limited thereto. Such grid members will expand upon a rise in temperature. If thermal expansion cannot be absorbed within the system, a predetermined temperature rise will cause the grid members to buckle. This opens up the ceiling, and permits the transmission of heat through the buckled area, thereby adversely affecting and often nullifying the fire retarding properties of the ceiling.

Normally, however, the system must be rigid, and this poses a problem because in providing a construction which normally is rigid, care must be taken not to interfere with the desired accommodation of expansion under elevated temperature conditions.

In addition to the foregoing it is sometimes desirable, for reasons of simplicity and economy, to combine the expansion absorbing means and the grid member connecting means, as distinguished from separate expansion joints and locking connectors.

The primary object of our invention is to provide supporting grid systems and the like with an expansible joint at the connection between grid members, in a normally rigid construction which will accommodate expansion of the grid members under elevated temperature conditions.

Another object of our invention is to provide the foregoing in a relatively simple and inexpensive construction which is easily fabricated, readily assembled, and durable and dependable in operation.

In one aspect thereof, an expansible connection constructed in accordance with our invention is characterized by the provision of a support member, a connector, means securing the connector to the support member for relative movement therebetween both lengthwise of the support member and in a generally vertical direction, and fusible means normally restraining the support member and the connector against such relative movement while fusing upon a predetermined rise in ambient temperature to permit the same.

In another aspect thereof, an expansible connection constructed in accordance with our invention is characterized by the provision of a support member, a connector adjacent one end of the member, and means including a shim of fusible material securing the connector to the member for relative movement therebetween lengthwise of the member, the shim being clamped between the connector and the member and normally frictionally restraining the same against such relative movement, the shim fusing upon a predetermined rise in temperature to provide sliding clearance between the connector and the member while lubricating the sliding surfaces thereof.

The foregoing and other objects, advantages and characterizing features of our invention will become clearly apparent from the ensuing detailed description of an illustrative embodiment thereof, considered in conjunction with the accompanying drawing illustrating the same wherein like reference numerals denote like parts throughout and wherein:

FIG. 1 is an exploded, fragmentary, perspective view of an expansible connection of our invention;

FIG. 2 is a fragmentary, top perspective view of assembled grid members incorporating expansible connections of our invention, as they would appear under normal temperature conditions;

FIG. 3 is a view like FIG. 2, but showing the assembled grid members as they would appear under abnormally elevated temperature conditions; and FIG. 4 is fragmentary sectional view taken about on line 4—4 of FIG. 3.

Referring now to the accompanying drawing, there is shown a supporting grid system incorporating the expansible connection of our invention. The illustrated system includes a first support member comprising, for example, a main T generally designated 1 which is releasably connected to a pair of second support members comprising, for example, cross T's generally designated 2. Support members 1 and 2 can be fabricated from a single piece of metal or other suitable material. Each support member comprises a normally vertical web 3, surmounted by a longitudinally extending, box sectioned reinforcing rim 4 and extending upwardly from lateral flanges 5 and 6 on opposite sides thereof.

Members 1 and 2 are releasably connected by a locking device of the type set forth in United States Patent 3,015,375 dated January 2, 1962. Essentially, the locking connection comprises a pair of connector parts generally designated 7 and 8, part 7 being carried by one cross T 2 and part 8 being carried by the other cross T 2. In practice, connectors 7 and 8 often will be carried at opposite ends of the same support member 2, for joining them in end to end relation as shown in FIGS. 2, 3 and 4.

Connector 7 is in the form of a hook of inverted, generally U shape having a pair of depending leg portions 9, 10 and extending over web 3 of main T 1. Legs 9 and 10 bear on main T flanges 5 and 6, respectively, adjacent a slot 11 through web 3 of main T 1. Leg 10 has a lateral extension 12 which is secured to web 3 of its support member 2 in accordance with our invention, as well be described hereafter.

Connector 8 comprises paired members 13, 13', on opposite sides of web 3 of its support member 2, and is secured to web 3 in accordance with out invention, as will be described. Members 13, 13' are laterally outwardly offset, adjacent the end of the support member 2, to provide spaced extensions 14 which bear on main T flange 5, and which extend through slot 11, as shown.

When assembling support members 1 and 2, the extensions 14 of connector 8 are fitted through slot 11 of main T 1, and the legs 9, 10 of connector 7 are slip-fitted downwardly, over the upstanding web 3 of main T 1, and between extension 14 of connector 8, as shown. Shoulders 22 engage behind connector leg 9, to preclude withdrawal of connector 8. This securely but releasably locks the support members 1, 2 in assembled relation, with flanges 5, 6 of member 2 abutting flanges 5, 6 of member 1 to provide a laterally rigid relationship therebetween. The flanges 5 and 6 lie in a common plane, for receiving and supporting ceiling tiles, not shown, and the connectors bear against the main T flanges to provide vertical support for the cross T's 2.

However, should there be an extreme rise in ambient temperature, such as might be caused by a fire, members 1 and 2 seek to expand. Such expansion would cause them to buckle, in the absence of means to accommodate such expansion without buckling. In accordance with our invention, such expansion accommodating means are provided in the joints between locking connectors 7, 8 and support members 2, as follows.

Webs 3 of support members 2 are provided with elongated slots 15 therein. Extension 12 on connector 7 is formed to provide a pair of laterally inwardly projecting tabs 16, and these project through slot 15 into and through slots 17 in a clamping plate 18 on the opposite side of web 3 from extension 12.

The tab 16 closest to leg 10 normally engages against the end of slot 15 closest to the end of the support member, while the other tab 16 is spaced from the opposite end of slot 15. Also, the upper edges of tabs 16 are disposed below the upper edge of slot 15. Accordingly, the connection provided by tabs 16, slot 15 and clamp plate 18 will permit lengthwise movement of support member 2 toward leg 10, and also will permit downward movement of the support member, relative to the connector.

Normally, however, connector 7 is held fixed to its support member 2, and they are frictionally restrained against such relative movement, by a fusible shim 19 interposed between connector extension 12 and support member web 3. Shim 19 has slots 20 extending upwardly from the lower edge thereof, whereby shim 19 slip-fits over tabs 16 during assembly. Tabs 16 are clinched over plate 18, clamping it against web 3 and clamping shim 19 between web 3 and extension 12, whereby the parts are securely held in the position shown in FIG. 2.

Connector 8 is secured to its support member 2 in the identical manner, except that instead of a separate clamp plate 18, member 13 serves as the slotted clamp plate, receiving tabs 16 struck from member 13'. A shim 19 is interposed between member 13' and web 3.

The ends of webs 3 of support members 2 are inwardly offset, as indicated at 21, whereby the flanges 5, 6 project beyond webs 3 in support members 2.

Thus, normally the support members are in the position shown in FIG. 2, and the assembly is rigid. However, upon a predetermined rise in ambient temperature, shims 19 fuse. That is, they melt, thereby providing sliding clearance between connectors 7 and 8 and support members 2. This enables the support members 2 to drop, relative to the connectors under their own weight and the weight of the supported tiles. The support members 2 then can expand lengthwise, the inward offset of webs 3 providing the necessary clearance enabling the projecting flange ends of members 2 to move beneath flanges 5 and 6 of main T 1, as shown in FIG. 3.

Thus, buckling is avoided. Support members 2 merely drop slightly, relative to members 1, without disrupting or opening up the ceiling. While FIG. 3 shows support members 2 as being slightly inclined, in many cases they will drop at both ends, depending upon location of the expansible connection and the pattern of heat distribution.

In addition to their function of normally maintaining the connectors and support members in predetermined, fixed relation, while providing sliding clearance therebetween upon a predetermined rise in ambient temperature, shims 19 have another important function, namely lubrication of the sliding parts. Upon fusing, shims 19 melt and lubricate the sliding surfaces of connectors 7 and 8, and support members 2, thereby insuring proper sliding and relative movement thereof.

Main T 1 can be provided with the expansible connections of this invention, adjacent its opposite ends. Alternately, it can be provided with an expansible joint intermediate its ends as shown in pending applications Serial Nos. 115,573 and 105,967, now abandoned.

Accordingly, it is seen that our invention fully accomplishes its intended objects. While only a single embodiment has been disclosed in detail, that has been done by way of illustration, it being our intention that the scope of our invention be limited only as required in the appended claims. Other types of locking connectors can be used with the expansible connection of our invention.

Having fully disclosed and completely described our invention, and its mode of operation, what we claim as new is:

1. An expansible connection for supporting grid systems and the like comprising a support member, a connector for connecting said support member to another support member, and means securing said connector to said support member for relative movement therebetween lengthwise of said support member, said means including a shim of fusible material clamped between said connector and said support member and normally frictionally restraining said support member and said connector against relative movement, said shim fusing upon a predetermined rise in ambient temperature, thereby providing sliding clearance between said support member and said connector and lubricating the sliding surfaces thereof, wherein said securing means also permit relative vertical movement between said support member and said connector.

2. An expansible connection as set forth in claim 1, wherein said support member comprises a web and a lateral flange, said connector being secured to said web at one end of said support member, and said web being inwardly offset from said lateral flange at said one end of said support member.

3. An expansible connection as set forth in claim 1, wherein said connector is secured to said support member adjacent one end thereof, together with a mating connector similarly secured to said support member adjacent the opposite end thereof.

4. An expansible connection for supporting grid systems and the like comprising, a support member, a connector for connecting said support member to another support member, and means securing said connector to said support member for relative movement therebetween lengthwise of said support member, said means including a shim of fusible material clamped between said connector and said support member and normally frictionally restraining said support member and said connector against relative movement, said shim fusing upon a predetermined rise in ambient temperature, thereby providing sliding clearance between said support member and said connector and lubricating the sliding surfaces thereof, wherein said support member has an upstanding web with a lengthwise elongated slot therein, said securing means including pin means extending through said slot, said pin means normally being spaced from the inner end of said slot and below the upper edge thereof.

5. An expansible connection for supporting grid systems and the like comprising a normally horizontal support member having a vertical web extending upwardly from a lateral flange, a connector, means securing said connector to said support member at one end thereof for relative movement therebetween both lengthwise of said support member and in a generally vertical direction, said web being inwardly offset relative to said flange at said one end of said support member, and means normally restraining said support member and said connector against such relative movement, said last-named means being operable upon a predetermined rise in ambient temperature to permit such relative movement between said support member and said connector.

References Cited by the Examiner

UNITED STATES PATENTS

| | | | |
|---|---|---|---|
| 1,131,925 | 3/1915 | Gervais | 189—45 |
| 2,148,310 | 2/1939 | Talen | 189—45 |
| 3,015,375 | 1/1962 | Lickliter et al. | 189—36 |
| 3,062,298 | 11/1962 | Nash | 189—45 X |
| 3,119,475 | 1/1964 | Adams | 189—45 X |
| 3,142,367 | 7/1964 | Brown et al. | 189—36 X |
| 3,149,704 | 9/1964 | Hodupp | 189—36 X |

HARRISON R. MOSELEY, *Primary Examiner.*

FRANK L. ABBOTT, *Examiner.*

P. M. CAUN, *Assistant Examiner.*